(12) United States Patent
He

(10) Patent No.: US 9,846,465 B2
(45) Date of Patent: Dec. 19, 2017

(54) ELECTRONIC DEVICE CONFIGURED TO CONTROL A CHARGING PROHIBITING PERIOD OF A BATTERY OF A SECOND ELECTRONIC DEVICE

(71) Applicant: KABUSHIKI KAISHA TOSHIBA, Minato-ku, Tokyo (JP)

(72) Inventor: Jingsha He, Tokyo (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 2 days.

(21) Appl. No.: 14/947,093

(22) Filed: Nov. 20, 2015

(65) Prior Publication Data

US 2016/0202742 A1 Jul. 14, 2016

Related U.S. Application Data

(60) Provisional application No. 62/103,521, filed on Jan. 14, 2015.

(51) Int. Cl.
| | | |
|---|---|---|
| G06F 1/26 | (2006.01) | |
| H02J 7/00 | (2006.01) | |
| G06F 1/16 | (2006.01) | |
| G06F 3/02 | (2006.01) | |
| G06F 9/44 | (2006.01) | |
| G06F 1/32 | (2006.01) | |

(52) U.S. Cl.
CPC .......... *G06F 1/263* (2013.01); *G06F 1/1626* (2013.01); *G06F 1/1632* (2013.01); *G06F 3/02* (2013.01); *G06F 9/4411* (2013.01); *H02J 7/00* (2013.01); *G06F 1/26* (2013.01); *G06F 1/3203* (2013.01)

(58) Field of Classification Search
CPC .......... G06F 1/26; G06F 1/3203; G06F 1/263; G06F 1/1626; G06F 1/1632; G06F 3/02; G06F 9/4411; H02J 7/00
See application file for complete search history.

(56) References Cited

U.S. PATENT DOCUMENTS

| | | | |
|---|---|---|---|
| 7,225,086 B2 | 5/2007 | Naitoh et al. | |
| 2002/0140400 A1* | 10/2002 | Hatori | H02J 3/005 320/130 |
| 2003/0090236 A1* | 5/2003 | Odaohhara | G06F 1/263 320/134 |
| 2012/0299530 A1* | 11/2012 | Hsu | H02J 1/14 320/103 |
| 2014/0215229 A1* | 7/2014 | Ito | G06F 1/3203 713/300 |

FOREIGN PATENT DOCUMENTS

| | | |
|---|---|---|
| JP | 2005-085027 A | 3/2005 |
| JP | 2014-079139 A | 5/2014 |

\* cited by examiner

*Primary Examiner* — Terrell Johnson
(74) *Attorney, Agent, or Firm* — Foley & Lardner LLP

(57) ABSTRACT

One embodiment provides an electronic device including an application which is configured to obtain peak shift information, a BIOS which is configured to receive the peak shift information from the application to calculate peak shift start and end times based on the peak shift information, a first unit, a first controller which is included in the first unit to execute a peak shift for a first battery based on the start and end times, a second unit, and a second controller which is included in the second unit. The second controller is configured to execute a peak shift for a second battery based on the start and end times received from the first controller.

6 Claims, 8 Drawing Sheets

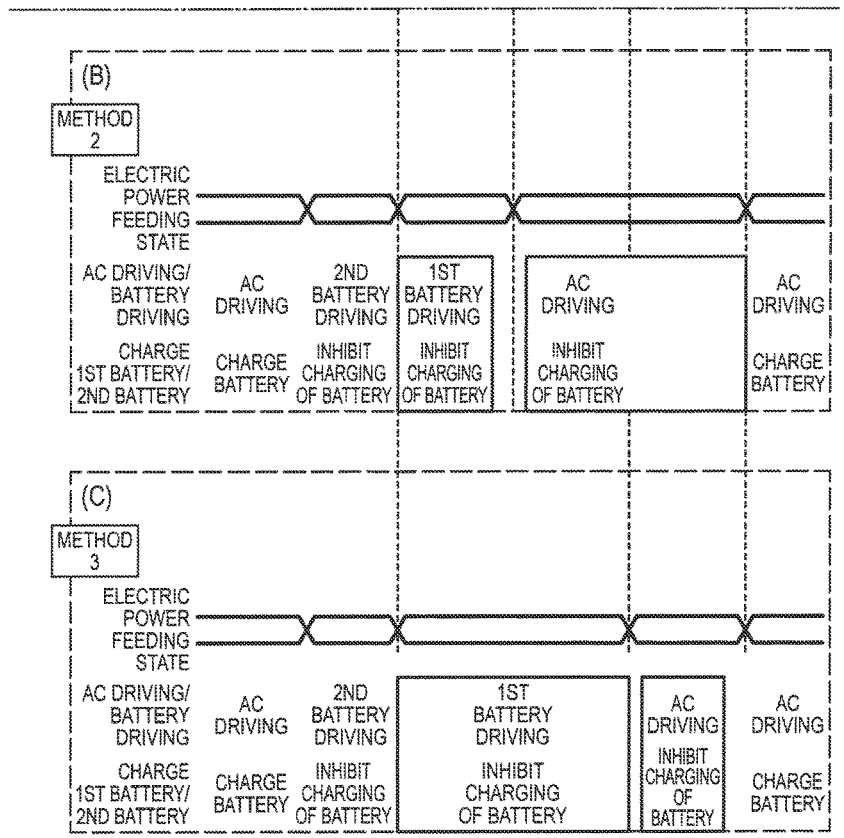

ELECTRONIC DEVICE CONFIGURED TO CONTROL A CHARGING PROHIBITING PERIOD OF A BATTERY OF A SECOND ELECTRONIC DEVICE

CROSS-REFERENCE TO RELATED APPLICATION(S)

This application claims priority from US Provisional Patent Application No. 62/103,521 filed on Jan. 14, 2015, the entire contents of which are incorporated herein by reference.

TECHNICAL FIELD

An embodiment of the present invention relates to an electronic device which controls a charging prohibiting period of a battery in, for instance, a KB Dock side.

BACKGROUND ART

In manufacturing a 2 in 1 note PC in which a built-in battery (hereinafter, referred to as a 2nd battery) is mounted on a Keyboard Dock (hereinafter, referred to as a KB Dock), even in a case where the PC is separated to only the KB Dock, when the KB Dock 2nd Battery is charged, a Peak-Shift function which stops a charging from an AC adapter and switches into a battery driving so as to suppress a power consumption is necessary in a time period which is high in a power consumption. However, the way of coping with such a demand has not been known yet.

MODE FOR CARRYING OUT THE INVENTION

An embodiment of the present invention will be described below.
(First Embodiment)

A first embodiment will be described by referring to FIG. 1 to FIG. 7.

Figure 1:
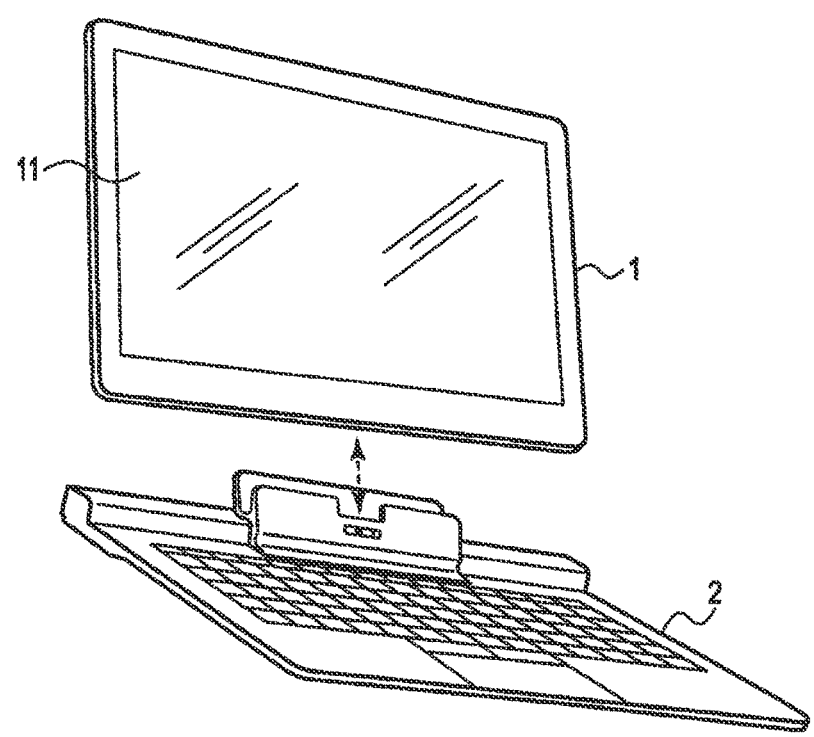
FIG. 1 is a perspective view showing an external appearance of an electronic device of an embodiment.

FIG. 1 is a perspective view showing an external appearance of an electronic device according to an embodiment. The electronic device is, for instance, a portable electronic device which allows a handwritten input by a pen or a finger. In the following, it is assumed that the electronic device is realized as a tablet computer 1.

As shown in FIG. 1, the tablet computer 1 includes a touch screen display 11. The touch screen display 11 is attached to be overlapped on an upper surface of the tablet computer 1. The touch screen display 11 includes a flat panel display and a sensor configured to detect a contact position of a pen or a finger on a screen of the flat panel display. The flat panel display is, for instance, a Liquid Crystal Display device (LCD). The sensor is, for instance, an electrostatic capacity type touch panel or an electromagnetic induction type digitizer. In this embodiment, it is assumed that two kinds of sensors, i.e. the digitizer and the touch panel are built in the touch screen display 11.

Figure 2:
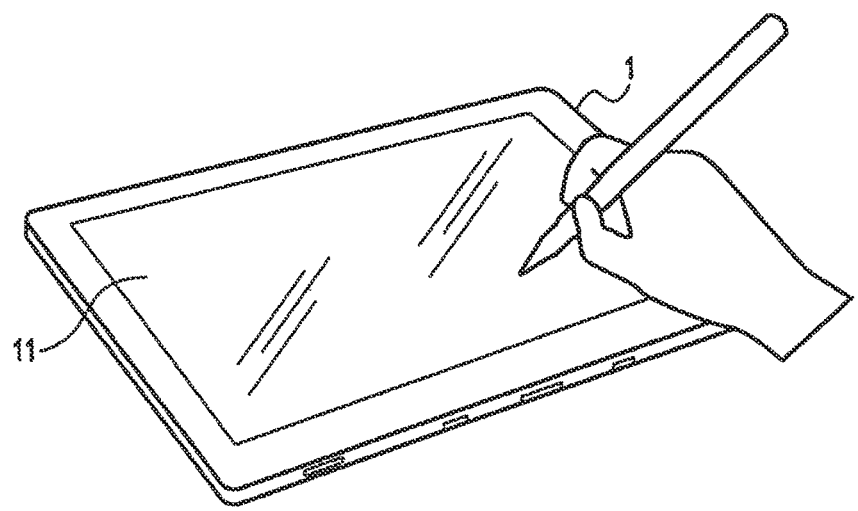
FIG. 2 is a diagram showing a first using style of the electronic device of the embodiment.
Figure 3:
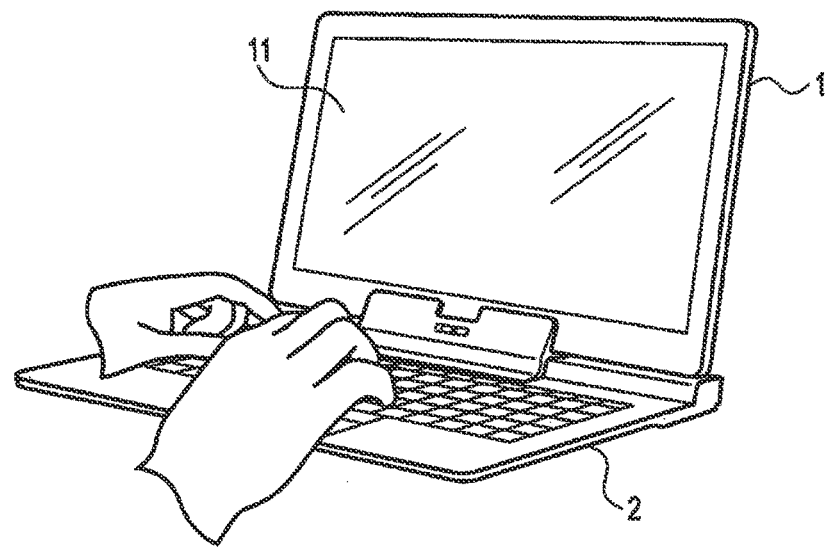
FIG. 3 is a diagram showing a second using style of the electronic device of the embodiment.

As shown in FIG. 1, the tablet computer 1 is configured such that an extension unit 2 mounted thereon a keyboard can be connected thereto as necessary. In the following explanation, the extension unit 2 is referred to as a keyboard dock 2. That is, the tablet computer 1 can be used in two kinds of styles including a state of a single main body (the keyboard dock is not connected) as shown in FIG. 2 and a state where the keyboard dock 2 is connected thereto as shown in FIG. 3. The state shown in FIG. 2 is referred to as a tablet mode. On the other hand, the state shown in FIG. 3 is referred to a clam shell mode.

Figure 4:
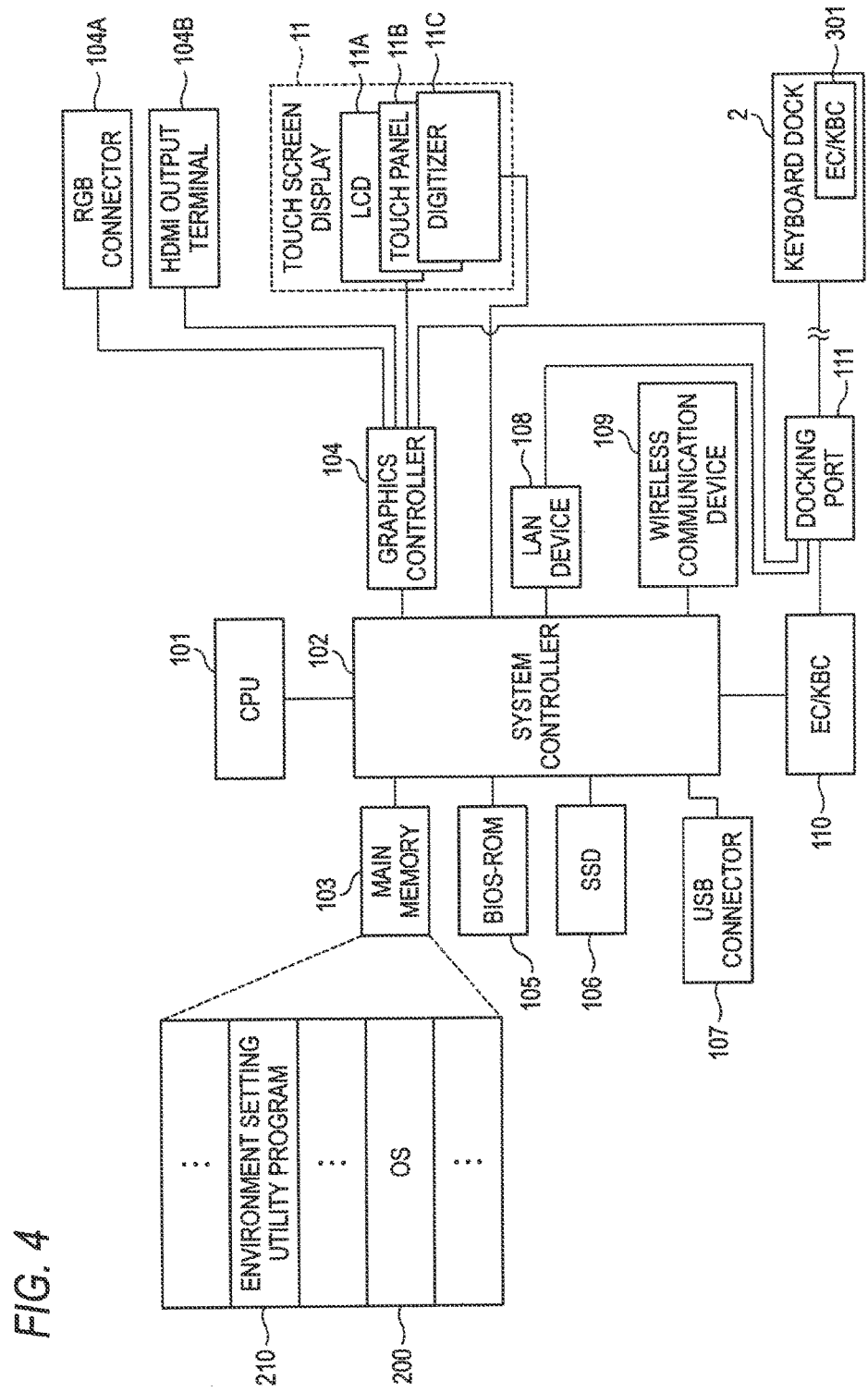
FIG. 4 is a diagram showing a system configuration of the electronic device of the embodiment.

FIG. 4 is a diagram showing a system configuration of the tablet computer 1. Components relating to a power control which include the extension unit 2 will be described below by referring to FIG. 5.

As shown in FIG. 4, the tablet computer 1 includes a CPU 101, a system controller 102, a main memory 103, a graphics controller 104, an RGB connector 104A, an HDMI (a registered trademark) (High-Definition Multimedia Interface) output terminal 104B, a BIOS-ROM 105, an SSD (Solid State Drive) 106, a USB connector 107, an LAN device 108, a wireless communication device 109, an EC/KBC (Embedded Controller/Keyboard Controller) 110 and a docking port 111.

The CPU 101 is a processor which controls operations of various kinds of modules in the tablet computer 1. The CPU 101 loads various kinds of programs in the main memory 103 from the SSD 106 to execute the programs. The programs executed by the CPU 101 include an Operating System (OS) 200 or an environment setting utility program 210 (described below) which operates under the control of the OS 200.

The CPU 101 also executes a Basic Input and Output System (BIOS [hereinafter, also referred to as a BIOS 250]) stored in the BIOS-ROM 105. The BIOS 250 is a program which controls hardware.

The system controller 102 is a device which connects a local bus of the CPU 101 to various kinds of components. The system controller 102 includes therein a memory controller which controls an access of the main memory 103 and a serial ATA controller which controls an access of the SSD 106. Further, the system controller 102 has a function for executing a communication with the graphics controller 104 and the EC/KBC 110 through a serial bus.

The graphics controller 104 is a display controller which controls an LCD 11A used as a display monitor of the tablet computer 1. The graphics controller 104 generates display signals (LVDS signals) to be supplied to the LCD 11A from display data output by the various kinds of programs. The graphics controller 104 can generate an analog RGB signal and an HDMI video signal from the display data. The analog RGB signal is supplied to an external display through the RGB connector 104A, and the HDMI video signal is supplied to the external display through the HDMI output terminal 104B. The HDMI output terminal 104B is a terminal which can transmit the HDMI video signal (the non-compressed digital video signal) and a digital audio signal by one cable. The graphics controller 104 can also transmit the analog RGB signal and the HDMI video signal to the keyboard dock 2 through the docking port 111. The docking port 111 is a port for electrically connecting the tablet computer 1 to the keyboard dock 2.

The LCD 11A displays a screen image in accordance with the display signal supplied from the graphics controller 104. In an upper layer of the LCD 11A, a touch panel 11 B is arranged as a first sensor which detects the contact position of a finger on the screen. Further, in a lower layer of the LCD 11A, a digitizer 11C is arranged as a second sensor which detects the contact position of the pen on the screen. The touch panel 11B is an electrostatic capacity type pointing device. The touch panel 11B detects the contact position on the screen with which the finger comes into contact and movement of the contact position. On the other hand, the digitizer 11C is the electromagnetic induction type pointing device. The digitizer 11C detects the contact position on the screen with which the pen comes into contact and movement of the contact position.

The USB connector 107 is a connector which connects a USB device, for instance, a USB memory. The LAN device 108 is a device which executes a wired communication based on, for instance, an IEEE 802.3 standard. A connection of the tablet computer 1 to an LAN is executed by connecting a LAN cable to a LAN connector provided in the keyboard dock 2 side to be connected to the docking port 111. The wireless communication device 109 is a device which executes a wireless communication based on, for instance, an IEEE 802.11g standard.

The EC/KBC 110 is an electric power management controller which executes a management of an electric power of the tablet computer 1 and has a function which turns on or turns off a power source of the tablet computer 1 in accordance with an operation of a power button by a user.

Further, an EC/KBC 301 is an electric power management controller which executes a management of an electric power of the keyboard dock 2. The EC/KBC 301 includes therein a keyboard controller which controls a keyboard mounted on the keyboard dock 2. Further, the EC/KBC 301 is configured to control a back light of the keyboard dock 2 or an LED which displays a state of an electric power.

Now, it is assumed that the power of the tablet computer 1 is turned on under a state where the keyboard dock 2 is connected to the docking port 111. When the power of the tablet computer 1 is turned on, the BIOS 250 executes a POST (Power On Self Test). The BIOS 250 checks various kinds of components of the tablet computer 1 by the POST to initialize settings of the various kinds of components. In the POST, the BIOS 250 recognizes that the keyboard dock 2 is connected to the tablet computer and obtains a Dock-ID from the keyboard dock 2. Then, the tablet computer 1 activates the OS 200. In the tablet computer 1, when the OS 200 is activated, the environment setting utility program 210 is activated under the control of the OS 200.

When the environment setting utility program 210 is activated, the environment setting utility program 210 obtains the Dock-ID of the keyboard dock 2 from the BIOS 250. The environment setting utility program 210 includes a Peakshift application 210A (not shown), which is described below. The Peakshift application 210A is configured as an application which obtains peak shift information (including a start/end time for setting a peak shift) from the tablet computer 1 or an external part (for instance, a network environment or the USB device).

Figure 5:
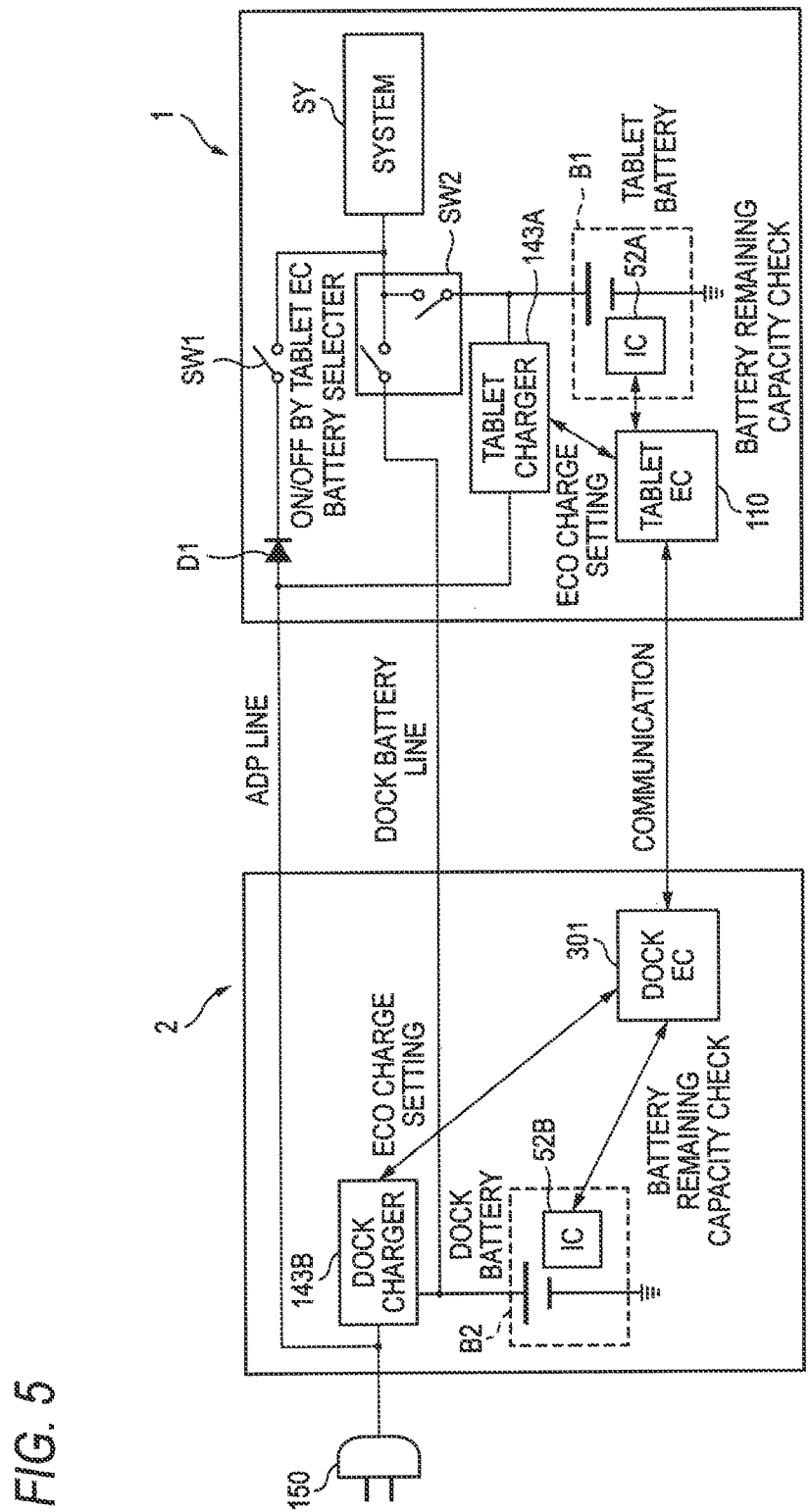
FIG. 5 is a schematic configuration diagram showing main parts of the embodiment.
Figure 6:
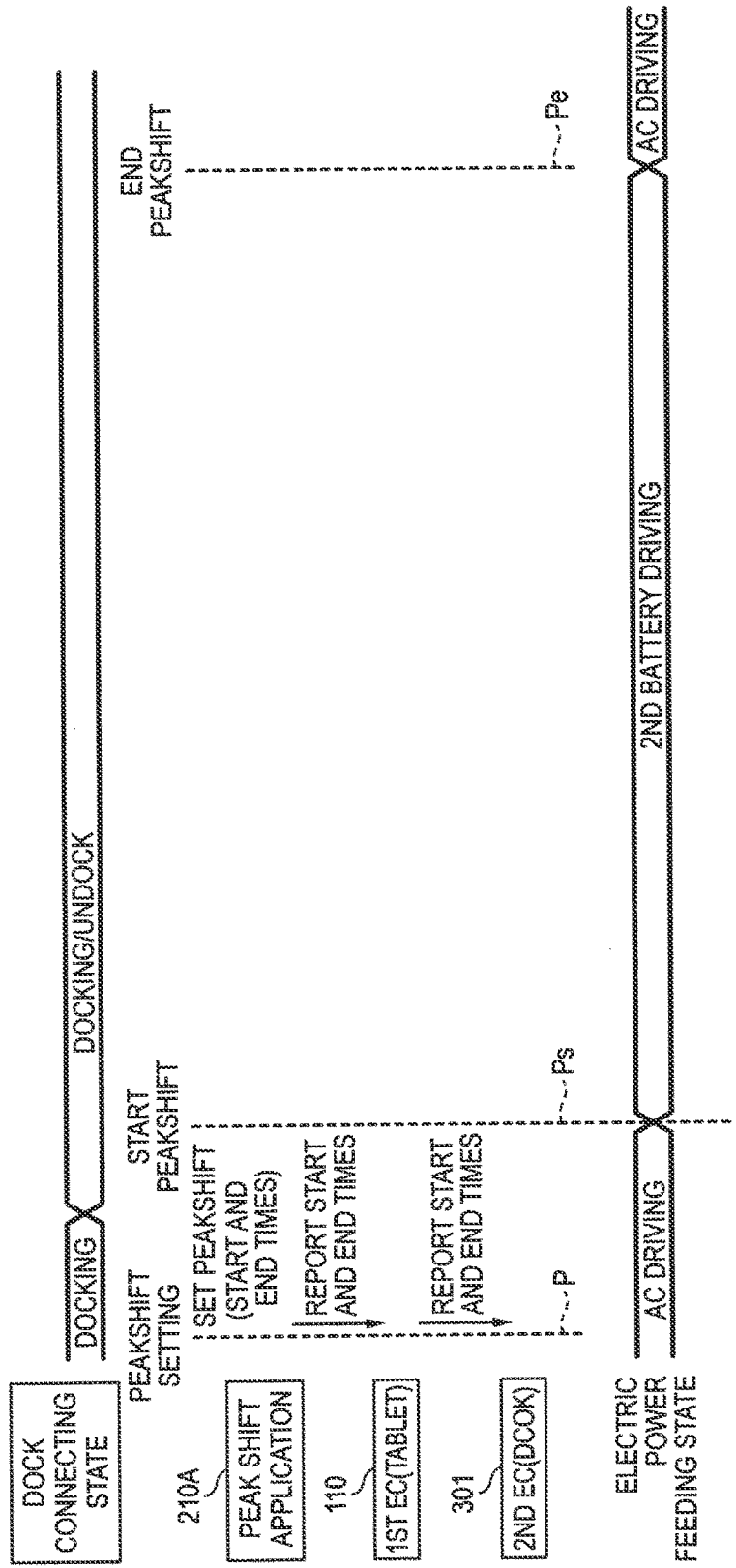
FIG. 6 is a sequence diagram showing operations of the main parts of the embodiment.

FIG. 5 is a functional configuration diagram showing main parts of the electronic device of the embodiment. A system is assumed where an example of an information device (the electronic device) on which a plurality of batteries are mounted corresponds to a Tablet device and a Dock shown in FIG. 5 and the Tablet device and the Dock include batteries, respectively.

In the tablet computer 1 which is the Tablet device, a constant voltage source is supplied by an AC adapter 150 connected as an external power source by using, for instance, a commercial alternating current as an ADP line. The AC adapter 150 is configured with elements which include a rectifier using a transformer, a diode bridge, a smoothing capacitor and the like. The constant voltage source is supplied to a Tablet Charger 143A through a backflow prevention diode D1 and a switch SW1 and can be also supplied to a system SY (an electric/electronic functional part of the tablet computer 1 except for the elements shown in FIG. 5).

The Tablet EC (1st EC/KBC) 110 is configured to execute a charging and discharging control communication with a battery B1 and the Tablet Charger 143A. For instance, when a firmware of the Tablet EC 110 charges the battery B1, the firmware determines a start/stop of charging of the battery B1 by determining a state of a (Gas Gauge) IC (52A) in the battery B1. This IC (52A) is an IC configured to provide information about various kinds of states of a battery cell in the battery B1 to a host (the firmware).

In the keyboard dock 2 which is the Dock, the constant voltage source similarly relates to a supply of an electric power to a Dock Charger 143B.

The Dock EC (EC/KBC) 301 is configured to execute a charging and discharging control communication with a battery B2 and a Dock Charger 143B. For instance, when a firmware of the Dock EC 301 charges the battery B2, the firmware determines a start/stop of charging of the battery B2 by determining a state of a (Gas Gauge) IC (52B) in the battery B2. This IC (52B) is an IC configured to provide information about various kinds of states of a battery cell in the battery B2 to a host (the firmware).

The EC/KBC 301 controls a lighting of the keyboard (not shown). The keyboard includes a backlight (not shown). The backlight is controlled to be turned on and off by the EC/KBC 301.

A switch SW2 is configured to supply an electric power to the system SY from either the battery B1 or the battery B2 in accordance with, for instance, the environment setting utility program 210. A communication between the Table EC 110 and the Dock EC 301 is executed by an IIC interface (described below).

In a technical background of the present embodiment, "in a certain device model, a 2nd battery and an EC/KBC (hereinafter, referred to as a 2nd EC/KBC) are mounted on a KB Dock. Thus, a function is necessary that supply of an electric power is stopped from an AC adapter in a time period in which a power consumption is high to suppress the power consumption by switching to a 2nd battery driving".

That is, a problem arises so far that "since any mechanism of controlling a charging period of the 2nd battery is not provided, the 2nd battery is charged even during the time period in which a power consumption is high". A method for solving the problem includes the following three items. The three items will be described below by referring to a sequence shown in FIG. 6.

(1) When a power source of a PC system is turned ON in a docking state, the Peakshift application transmits Peakshift start and end times to the EC via the BIOS. The BIOS calculates a time from a present time based on the information received from the application and sets the time up to that time to the 1st EC. The 1st EC transmits the received information to the 2nd EC. The 1st EC and the 2nd EC start timers and respectively count down.

(2) Thereafter, even in an undock state, when it becomes a Peakshift setting start time, the 2nd EC executes a battery charging stop process at the set time irrespective of a docking/undock state.

(3) When it becomes a Peakshift end time, the 2nd EC executes a battery charging start process at the set time.

At timing P when the power source is turned ON, the Peakshift application 210A transmits the peak shift information (the start/end time for setting the Peakshift) to the BIOS. The BIOS calculates the Peakshift start and end time by using these times and transmits the Peakshift start and end time to the 1st EC 110. The 1st EC 110 transmits the Peakshift start and end time to the 2nd EC 301.

When it becomes the Peakshift start time Ps, an AC driving is switched to a 2nd battery driving under both docking and undock states.

Further, when it becomes the Peakshift end time Pe, the 2nd battery driving is switched to return to the AC driving.

Figure 7A:
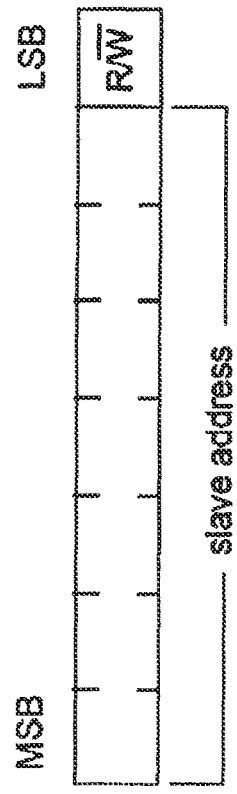
FIGS. 7A and 7B are diagrams which explain an IIC (I²C) interface used in the embodiment.
Figure 7B:
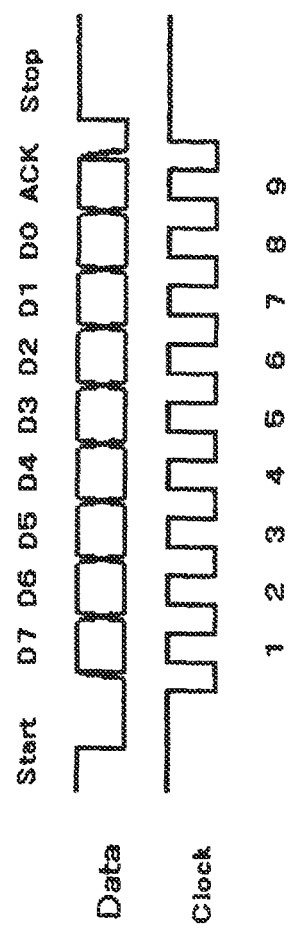

FIGS. 7A and 7B are diagrams which explain the IIC interface. A bus (IIC-BUS) of the IIC interface includes two communication lines for a clock output to be pulled up from a master device and data in a bidirectional communication of the master device and a slave device.

FIG. 7A shows an example of a configuration of a device address. The device address is configured by high-order 7 bits. When a low-order 1 bit is 0, this indicates writing, and when the low-order 1 bit is 1, this indicates reading.

FIG. 7B is a schematic diagram of timing of the two lines. As shown in an upper side, when a level value of a signal of the data line is LOW, it becomes a Start state such that the data is sent from the high-order bits. When a level value of a signal of the data lien is HIGH, it becomes a Stop state. The timing of a corresponding clock line is shown in a lower side. FIG. 7B shows an example of a one bite transfer. When the data and ACK are repeated a plurality of times until the Stop state, a first byte is a slave address, however, remaining bytes can be set to contents of a communication.

(Second Embodiment)

Figure 8:
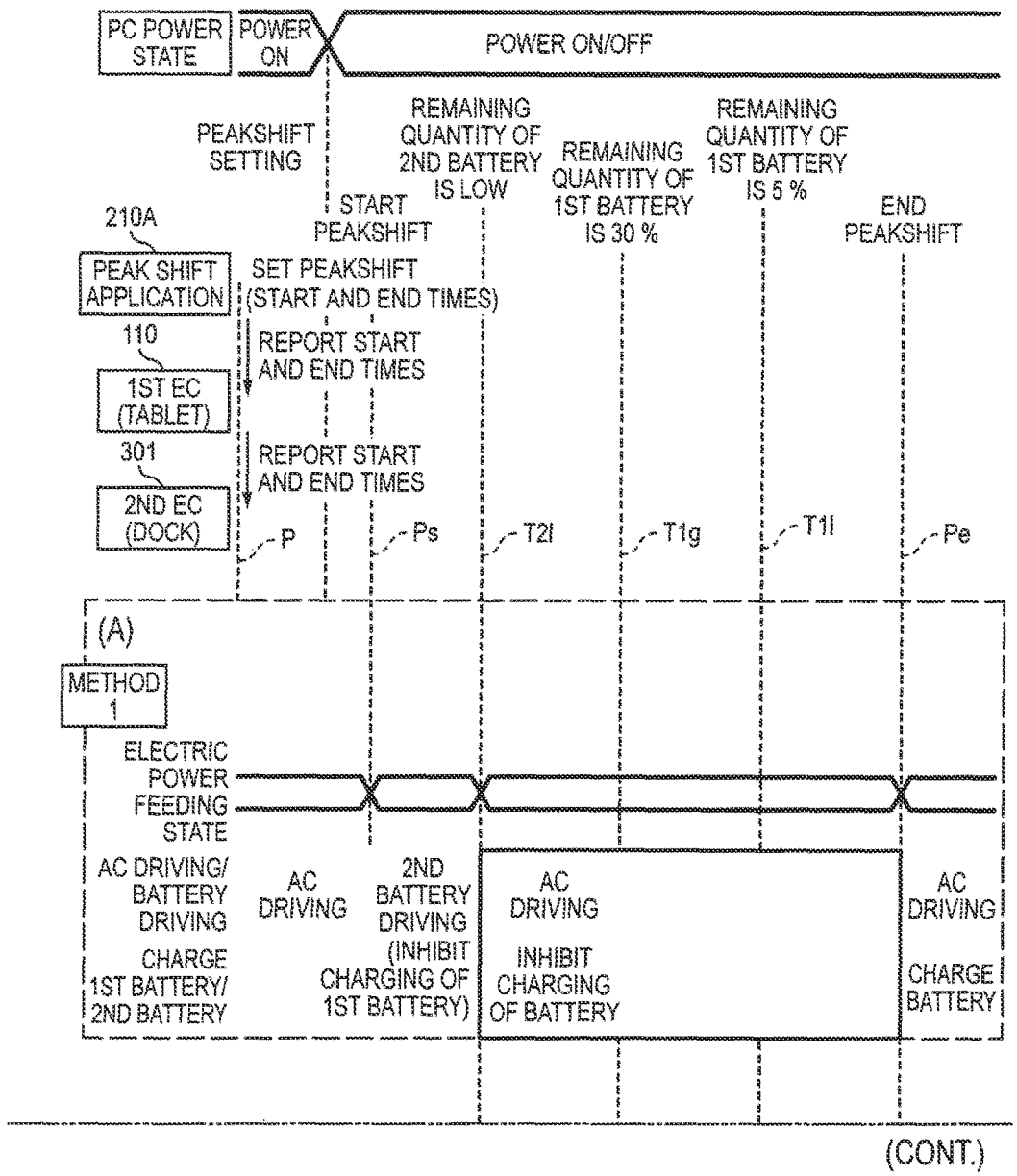
FIG. 8 is a sequence diagram showing operations of main parts used in another embodiment.

A second embodiment of the present invention will be described below by referring to FIG. 8. The second embodiment is an extension of the first embodiment, so that an explanation common to both the embodiments will be omitted. A method for solving a problem includes following two items. The two items will be described below by referring to a sequence shown in FIG. 8.

(1) When a power source of a PC system is turned ON in a docking state, the Peakshift application transmits Peakshift start and end times to the EC via a BIOS. The BIOS calculates a time from a present time based on the information received from the application and sets a time up to that time to the 1st EC. The 1st EC transmits the received information to the 2nd EC. The 1st EC and the 2nd EC start timers and respectively count down.

(2) Under a docking state, in a Peakshift control period which starts from the Peakshift start time Ps, the 2nd battery driving is executed. When there is no remaining capacity of the 2nd battery, one of the following three cases are selected and continuously used until the Peakshift end time Pe. That is, when it becomes the Peakshift start time Ps, an AC driving is switched to the 2nd battery driving under both the states where the power source is turned ON and OFF (the batteries are prohibited from being charged).

<Method 1 (FIG. 8(a)): A charged capacity of the battery of the Tablet side is retained and the EC switches to the AC driving>

When the remaining capacity of the 2nd battery is insufficient (Low) (timing T21), the 2nd battery driving is switched to the AC driving.

<Method 2 (FIG. 8(b)): the EC is set to a Tablet battery driving until a remaining capacity of a Tablet side battery reaches a reference value (for instance, the remaining capacity is 30%), and then, the EC changes to the AC driving>

When the remaining capacity of the 2nd battery becomes insufficient (Low)(timing T21), the 2nd battery driving is switched to the Tablet battery driving. When the remaining capacity of the Tablet side battery lowers to the reference value, The Tablet battery driving is switched to the AC driving.

<Method 3 (FIG. 8(c)): When a battery state of the Tablet side battery is Low (a remaining capacity is 5%), the EC switches the AC driving from the battery driving>

When the remaining capacity of the 2nd battery is insufficient (Low)(timing T21), the 2nd battery driving is switched to the Tablet battery driving. When the remaining capacity of the Tablet side battery is becomes insufficient (Low, for instance 5%), the Tablet battery driving is switched to the AC driving.

As described above, since the KB Dock side battery and the 2nd EC/KBC are mounted, the Peakshift control can be executed even in the undock state. Thus, in the time period in which the power consumption is high, the supply of the electric power from the AC adapter can be stopped such that the power consumption can be suppressed by switching the AC driving to the battery driving.

During the Docking state, in the Tablet side, the setting information of the Peakshift is reported to the 2nd EC/KBC via the 1st EC/KBC. Accordingly, under a state that the Docking state is released, the Peakshift control can be executed also in the KB side.

Further, in the docking state, during the Peakshift control period, the 2nd battery driving is executed. When there is no remaining capacity of the 2nd battery, one of the following three cases may be selected and continuously used.

(A) The charged capacity of the Tablet side battery is retained to switch the 2nd battery driving to the AC driving.

(B) The Tablet battery driving is executed by the Tablet battery until the remaining capacity of the Tablet side battery reaches the reference value (the remaining capacity is 30%), and then, the Tablet battery driving is switched to the AC driving.

(C) The battery state of the Table side battery becomes Low (the remaining capacity is 5%), the Tablet battery driving is switched to the AC driving.

In the embodiment, under the states of (A) to (C), the driving is executed under a power saving (the Peakshift) mode and both the batteries are not charged.

The present invention is not limited to the above-described embodiments and may be additionally modified in various ways and embodied within a scope that does not deviate from the gist of the present invention.

Further, when the plurality of component elements disclosed in the above-described embodiments are suitably combined together, various inventions may be devised. For instance, some component elements may be deleted from all the component elements disclosed in the embodiments. Further, the component elements of the different embodiments may be suitably combined together.

What is claimed is:

1. An electronic device comprising:
   an application which is configured to obtain peak shift information;
   a basic input and output system (BIOS) which is configured to receive the peak shift information from the application to calculate peak shift start and end times based on the peak shift information;
   a tablet computer;
   a first embedded controller/keyboard controller (EC/KBC) which is included in the tablet computer to execute a peak shift for a first battery based on the start and end times;
   a keyboard dock; and
   a second EC/KBC which is included in the keyboard dock,
   wherein the peak shift information is transferred to the second EC/KBC via the first EC/KBC in a docking state in which the tablet computer is connected with the keyboard dock, and
   wherein the second EC/KBC is configured to execute a peak shift for a second battery based on the start and end times received from the first EC/KBC in an undock state in which the tablet computer is separated from the keyboard dock.

2. The electronic device according to claim 1,
   wherein when a remaining capacity of the second battery becomes an insufficient state during an execution of the peak shift for the second battery, the second EC/KBC is configured to switch to an AC driving.

3. The electronic device according to claim 1,
   wherein when a remaining capacity of the second battery becomes an insufficient state during an execution of the peak shift for the second battery, the second EC/KBC is configured to switch to a battery driving of the first battery.

4. The electronic device according to claim 3,
   wherein when a remaining capacity of the first battery lowers to a reference value during the battery driving of the first battery, the second EC/KBC is configured to switch to an AC driving.

5. The electronic device according to claim 3,
   wherein when a remaining capacity of the first battery becomes an insufficient state during the battery driving of the first battery, the second EC/KBC is configured to switch to an AC driving.

6. The electronic device according to claim 1,
   wherein the tablet computer includes the application and the BIOS.

* * * * *